Figure 1:
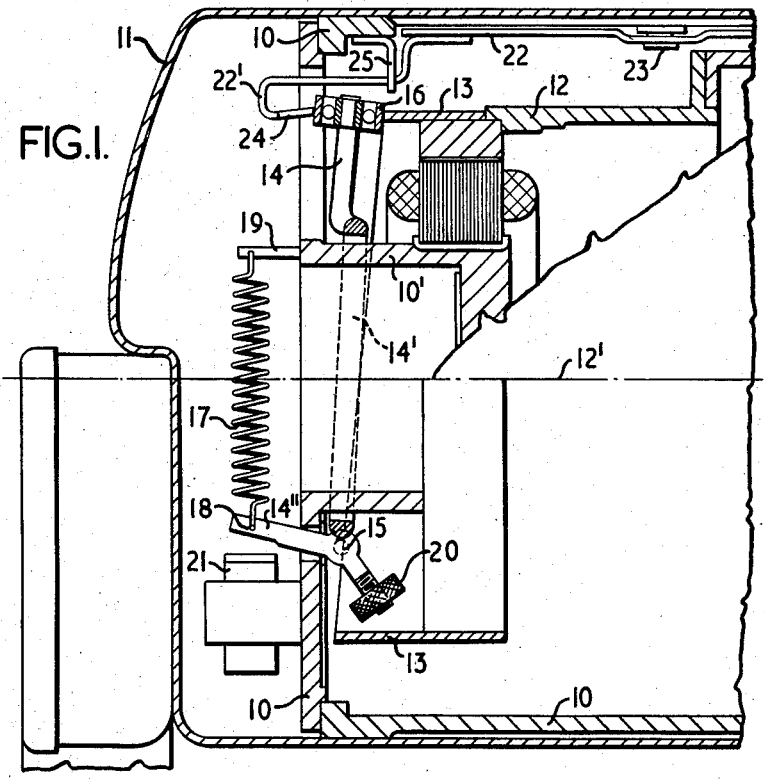

Feb. 24, 1959 J. W. BARNES ET AL 2,874,576

GYROSCOPE APPARATUS

Filed Sept. 3, 1957

Inventors
Jeffery Walton Barnes
Roy Albert Herring
By Cameron, Kerkam & Sutton Attorneys

United States Patent Office 2,874,576
Patented Feb. 24, 1959

2,874,576

GYROSCOPE APPARATUS

Jeffery W. Barnes, Farnborough, and Roy A. Herring, Bracknell, England, assignors to Ferranti, Limited, Hollinwood, Lancashire, England, a company of Great Britain and Northern Ireland Application September 3, 1957, Serial No. 681,758

Claims priority, application Great Britain September 5, 1956

5 Claims. (Cl. 74—5.1)

This invention relates to gyroscope (gyro) apparatus for defining the true vertical and which is normally maintained with its spin axis substantially vertical, for example by the action of pendulum switches or similar devices mounted on the gimbal rings and controlling torque motors acting about the gimbal axes in a known manner. Difficulties encountered with gyros of this type are those of setting the gyro in the correct vertical position in the shortest possible time after starting the gyro spin motor, and of preventing spinning of the whole gimbal system about its outer axis during slowing down of the gyro after switching off. The process of bringing the gyro to such vertical position is hereinafter referred to as "centralizing." The said spinning action is caused by the torque applied by the gyro to the inner gimbal through bearing friction and air drag while the gyro is slowing down. The first effect of such torque is to precess the gyro until its spin axis lines up with the outer gimbal axis or a limit stop is hit, when the torque then acts to spin the whole system about the outer gimbal axis.

It is known to overcome these difficulties with a caging device by means of which the operator centralises the gimbal system before starting or stopping the gyro spin motor, but such a device involves considerable mechanical complication as well as the risk that the operator will forget to uncage the gyro. It is also known to make the outer gimbal pendulous, but excessive errors are introduced by this method when large lateral accelerations are applied to the system, for example in an aircraft during a steeply banked turn.

An object of the present invention is to provide vertical gyro apparatus in which the above difficulties are overcome.

According to the present invention, gyro apparatus for defining the true vertical includes a gyro having inner and outer gimbals, a cam rigidly secured to the outer gimbal, a roller for engaging the cam, constraining means for urging the roller into contact with the cam in such manner as to cause rotation of the outer gimbal about its axis towards its centralised position when displaced therefrom, and counteracting means operable when the gyro rotor is spinning for counteracting said constraining means to effect and maintain disengagement of the roller from the cam.

Display means may be provided for operation by said counteracting means to indicate whether the roller is or is not in engagement with the cam.

A further advantage of the invention is that it permits in some of its embodiments the provision of means for warning the operator of failure in the power supply to the gyro spin motor.

Figure 2:
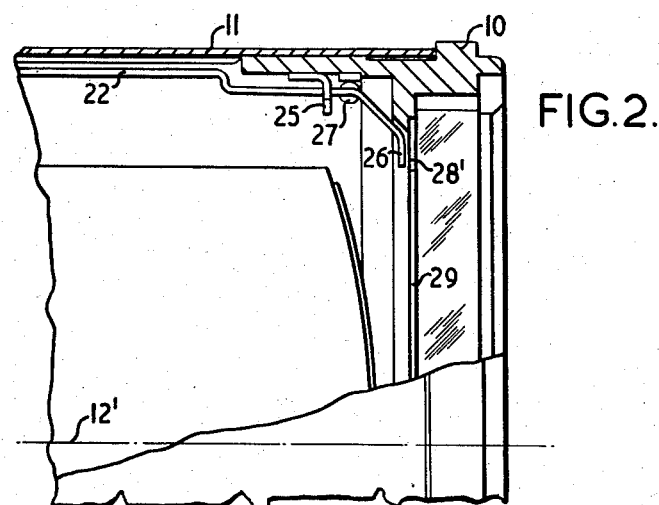

In the accompanying drawings:

Figures 1 and 2 are partial cross sectional views of parts of an artificial horizon instrument for an aircraft to illustrate one embodiment of the invention.

Referring particularly to Figure 1, in carrying the invention into effect in accordance with the form shown in the drawings, and by way of example, an artificial horizon for aircraft consists of a frame 10, contained in a case 11, carrying the gyro (not shown) in an inner gimbal (not shown) and an outer gimbal 12 mounted on bearings (not shown) for rotation about a horizontal axis $12^1$.

The outer gimbal carries a face cam 13 rigidly attached to the gimbal and rotatable therewith about axis $12^1$. A member comprising an upper portion 14, a central portion $14^1$ and a lower portion $14^{11}$ is supported in the frame by bearings, one of which is shown at 15. The upper portion 14 carries a roller 16 mounted on ball bearings at its upper end in position to co-act with cam 13. The central portion $14^1$ is annular to surround the inwardly projecting portion $10^1$ of the frame. The lower portion $14^{11}$ forms a bell-crank lever with the portions 14 and $14^1$ and constraining means in the form of a helical spring 17 is secured to this lower portion at 18.

The top end of the spring 17 is secured to a portion 19 of the frame and, acting through the portions $14^{11}$, $14^1$, and 14, urges roller 16 into contact with and to press on cam 13. The cam is so orientated relative to the outer gimbal that whenever the outer gimbal is displaced from its centralized position the pressure of roller 16 on the cam, due to the constraining means or spring 17, causes the gimbal to rotate about its axis $12^1$ to its centralized position. Further rotation of the gimbal by the cam then ceases, the position of cam and gimbal being then as shown in Figure 1.

A balance weight 20 is provided at the elbow of the bell-crank to counteract the effect on this member of acceleration or deceleration of the aircraft in which the instrument is fitted.

An electromagnet 21, mounted on the frame as shown, attracts arm $14^{11}$ when energized so as to counteract the force exerted by spring 17, and thus to remove the roller 16 away from the cam, and hold it in a disengaged position. The magnet is energized from the same source of power as the gyro spin motor.

Display means is provided to indicate whether or not the roller is in engagement with the cam. For this purpose an indicator lever 22, pivoted to the frame at 23 for a restricted rotational movement normal to the plane of the paper, has rigidly attached thereto a strip $22^1$ having a cam face 24 disposed so as to be engaged by roller 16 when the roller is disengaged from the cam 13. When cam 24 is so engaged by the roller, lever 22 is deflected about its pivot 23. Lever 22 extends from back to front of the apparatus and is provided with horizontal guides 25 secured to the frame. At the front end of the apparatus the indicator lever carries a flag 26 (see Figure 2). A return spring 27 biases the indicator lever so that when roller 16 is disengaged from the cam face 24 the flag is visible behind a window 28' in the dial 29 of the instrument.

Considering the situation when no power is applied to the gyro spin motor and the electromagnet, the roller 16 is urged against cam 13 by the spring 17 and the outer gimbal 12 is maintained in its centralized position as described above. The roller is disengaged from indicator lever 22, which is in its biased position under the influence of the return spring 27 and the flag is visible behind the window in the dial.

On starting the gyro spin motor the electromagnet is energized simultaneously from the same source of power and acts to remove the roller from the cam 13, thus allowing the gyro to operate normally free from restraint. In these circumstances, the roller, coacting with the indicator lever cam 24, moves the indicator lever against the return spring, and the flag is removed from view behind the window in the dial of the instrument.

When the gyro spin motor is switched off, the electromagnet is de-energized and the spring 17 urges the roller against the cam 13. In moving towards the cam 13 the roller disengages from the indicator lever cam 24 allowing the spring 27 to move the indicator lever to position the flag behind the window in the dial. When the gyro has hit the inner gimbal limit stop or has stopped rotating, the roller, coacting with cam 13, centralizes the outer gimbal.

As the counteracting means (electromagnet 21) is energized by the same source as that which drives the rotor, the appearance of the flag at a time when the gyro is supposed to be running affords an indication of the failure of the source.

Provided the outer gimbal is sufficiently damped to stop the initial nutation of the gyro on starting up, the inner gimbal ring need not be centralized because the accelerating torque of the gyro spin motor acts quickly to bring the gyro spin axis normal to the outer gimbal axis, this torque disappearing as the gyro reaches full speed. The required damping may be temporarily applied by means of a friction brake in known manner.

The torque exerted on the outer gimbal by the roller and cam should be the value required to prevent spinning of the gimbal while the gyro is slowing down because this value will normally be greater than that required to centralize the outer gimbal. The cam 13 may be shaped so that the torque exerted upon the outer gimbal varies directly with the displacement of the outer gimbal from its centralized position, maximum torque being exerted in a position diametrically opposed to the centralized position. In the event of failure of the electromagnet the force applied to the outer gimbal will not exceed that applied by the known pendulous method.

The above-described apparatus may be varied within the scope of the invention. For example the gyro spin motor may be a turbine, air driven, in which case the electromagnet is replaced by suitable pneumatic device for disengaging the lever 14 from the cam 13. Other arrangements for the lever 14 and the cam 13 will be obvious to those skilled in the art.

It is not essential to the operation of the invention to provide the indicator lever 22 and the flag 26, and these features, if provided, may obviously be arranged in other ways than that described.

It will be appreciated that the gyro apparatus in accordance with the invention provides the required centralizing in a simple manner free from the mechanical complications of known caging devices and without the disadvantage of known pendulous devices of introducing excessive errors during lateral accelerations.

What we claim is:

1. In gyroscope apparatus for defining the true vertical of the type including a gyro having inner and outer gimbals and a gyro spinning motor, means for centralizing the outer gimbal when and only when the gyro spinning motor is deenergized comprizing a circumferentially continuous cam rigidly secured to said outer gimbal, a roller for engaging said cam, constraining means operable when the gyro spinning motor is deenergized for urging said roller into contact with said cam so as to apply to said outer gimbal only a centralizing torque not in excess of that applied by the known pendulous method and to cause rotation of said gimbal about its axis towards its centralized position when displaced therefrom, and counteracting means operable when the the gyro spinning motor is energized for counteracting said constraining means and moving said roller out of contact with said cam.

2. Gyroscope apparatus as claimed in claim 1 of the type including an electrical gyro spinning motor and a source of power for energizing said motor, and wherein said counteracting means comprises an electromagnet adapted to be energized by said source simultaneously with energization of said motor and to be deenergized simultaneously with deenergization of said motor.

3. Gyroscope apparatus as claimed in claim 1 including display means for visually indicating when said roller is in engagement with said cam.

4. Gyroscope apparatus as claimed in claim 1 wherein said cam is so shaped that the centralizing torque exerted on said outer gimbal when said cam is engaged by said roller varies directly with the rotational displacement of said outer gimbal from the centralized position thereof.

5. In gyroscope apparatus for defining the true vertical of the type including a gyro having inner and outer gimbals, a gyro spinning motor and a source of power for energizing said motor, means for centralizing the outer gimbal when and only when the gyro spinning motor is deenergized comprising a cam rigidly secured to said outer gimbal, a roller for engaging said cam, constraining means operable when the gyro spinning motor is deenergized for urging said roller into contact with said cam so as to apply to said outer gimbal only a centralizing torque not in excess of that applied by the known pendulous method and to cause rotation of said gimbal about its axis towards its centralized position when displaced therefrom, counteracting means operable by said power source when the gyro spinnig motor is energized for counteracting said contstraining means and moving said roller out of contact with said cam, and display means operable only when the gyro spinning motor is deenergized for visually indicating when said roller is in engagement with said cam and thereby also indicating any failure of said power source.

References Cited in the file of this patent

UNITED STATES PATENTS

| | | |
|---|---|---|
| 1,982,637 | Carlson | Dec. 4, 1934 |
| 2,441,307 | Alkan | May 11, 1948 |
| 2,641,133 | Barkalow et al. | June 9, 1953 |
| 2,729,978 | Judson | Jan. 10, 1956 |
| 2,808,726 | Chombard | Oct. 8, 1957 |